US008730425B2

(12) United States Patent
Ji et al.

(10) Patent No.: US 8,730,425 B2
(45) Date of Patent: May 20, 2014

(54) LIQUID CRYSTAL DISPLAY DEVICE

(75) Inventors: Byung-Hwa Ji, Goyang-si (KR); Kyung-Sik Dan, Goyang-si (KR); Se-Min Lee, Paju-si (KR); Heong-Soo Park, Daejeon (KR)

(73) Assignee: LG Display Co., Ltd., Seoul (KR)

( * ) Notice: Subject to any disclaimer, the term of this patent is extended or adjusted under 35 U.S.C. 154(b) by 170 days.

(21) Appl. No.: 12/955,645

(22) Filed: Nov. 29, 2010

(65) Prior Publication Data

US 2011/0128463 A1 Jun. 2, 2011

(30) Foreign Application Priority Data

Nov. 27, 2009 (KR) .................. 10-2009-0115994

(51) Int. Cl.
  *G02F 1/1333* (2006.01)
  *G02F 1/1335* (2006.01)
  *F21V 7/04* (2006.01)

(52) U.S. Cl.
  USPC ............... 349/58; 349/62; 362/632; 362/633; 362/634

(58) Field of Classification Search
  USPC ................... 349/58–60, 62, 64, 65; 362/615, 362/632–634
  See application file for complete search history.

(56) References Cited

U.S. PATENT DOCUMENTS

| 6,166,788 | A  | * | 12/2000 | Ha et al. ......................... | 349/58 |
| 6,512,558 | B2 | * | 1/2003  | Kim ............................... | 349/58 |
| 2006/0007367 | A1 | * | 1/2006  | Cho ............................... | 349/58 |
| 2008/0129918 | A1 | * | 6/2008  | Kim et al. ....................... | 349/58 |
| 2008/0225203 | A1 | * | 9/2008  | Kim ............................... | 349/65 |
| 2009/0296014 | A1 | * | 12/2009 | Tseng et al. ..................... | 349/58 |
| 2009/0316064 | A1 | * | 12/2009 | Kono et al. ...................... | 349/58 |

FOREIGN PATENT DOCUMENTS

| CN | 1881040   | 12/2006 |
| CN | 101025505 | 8/2007  |

(Continued)

OTHER PUBLICATIONS

Office Action issued in corresponding Chinese Patent Application No. 2010102739594, mailed Jan. 9, 2012.

(Continued)

*Primary Examiner* — Jessica M Merlin
(74) *Attorney, Agent, or Firm* — Brinks Gilson & Lione

(57) ABSTRACT

A liquid crystal display device includes a liquid crystal panel; a backlight unit disposed under the liquid crystal panel and providing a light to the liquid crystal panel, the backlight unit including a reflective sheet, a light guide plate on the reflective sheet, an optical sheet on the light guide plate and a light emitting diode (LED) assembly at one side of the light guide plate, the light emitting diode assembly including at least one LED as a light source; a main frame that surrounds sides of the liquid crystal panel and the backlight unit, the main frame including a first portion, where the LED assembly is fixed, and a second portion extending from the first portion, the second portion covering a top portion of the LED assembly; a bottom frame under the reflective sheet and being combined with the main frame; and a top frame that surrounds an edge of the liquid crystal panel and attaches to the bottom frame and the main frame.

11 Claims, 5 Drawing Sheets

(56) References Cited

FOREIGN PATENT DOCUMENTS

| | | |
|---|---|---|
| CN | 100432794 | 11/2008 |
| CN | 101881907 A | 11/2010 |
| JP | 10-153763 | 6/1998 |
| JP | 2008-292689 | 12/2008 |
| KR | 1020050068530 A | 7/2005 |
| KR | 1020050108885 A | 11/2005 |
| KR | 1020070056346 A | 6/2007 |
| KR | 1020070101946 A | 10/2007 |
| KR | 1020080001901 A | 1/2008 |

OTHER PUBLICATIONS

Office Action issued in corresponding Korean Patent Application No. 10-2009-0115994, mailed Jan. 31, 2013.

Office Action issued in corresponding Chinese Patent Application No. 201010273959.4, mailed Nov. 12, 2012.

Office Action issued in corresponding Chinese Patent Application No. 201010273959.4, mailed Nov. 26, 2013, 7 pages.

* cited by examiner

LIQUID CRYSTAL DISPLAY DEVICE

The present disclosure claims the benefit of Korean Patent Application No. 10-2009-0115994 filed in Korea on Nov. 27, 2009, the content of which is hereby incorporated by reference in its entirety.

BACKGROUND

1. Field of the Disclosure

The disclosure relates to a liquid crystal display (LCD) device, and more particularly, to an LCD device using a light emitting diode and being capable of preventing a light leakage.

2. Discussion of the Related Art

The liquid crystal display (LCD) devices are widely used for notebook computers, monitors, TV, and so on, because of their high contrast ratio and characteristics adequate to display moving images. The LCD devices use optical anisotropy and polarization properties of liquid crystal molecules to display images.

The LCD devices require a liquid crystal panel including first and second substrates and a liquid crystal layer interposed therebetween. An arrangement of the liquid crystal molecules in the liquid crystal layer is changed by an electric field induced in the liquid crystal panel to control light transmissivity.

Generally, an additional light source is required because the LCD panel is a non-emissive-type display device. Accordingly, a backlight unit is disposed under the LCD panel. The LCD device displays images using light produced by the backlight unit and supplied to the LCD panel. A cold cathode fluorescent lamp (CCFL), an external electrode fluorescent lamp and a light emitting diode (LED) are used as a light source of the backlight unit. Among these light sources, the LEDs are widely used because of advantages in a size, power consumption and reliability.

FIG. 1 a cross-sectional view of the related art LCD device using an LED as a light source. Referring to FIG. 1, the LCD device includes a liquid crystal panel 10, a backlight unit 20, a main frame 30, a bottom frame 50, and a top frame 40. The liquid crystal panel 10 includes first and second substrates 12 and 14 facing each other and a liquid crystal layer (not shown) therebetween. First and second polarizing plates 19a and 19b are respectively disposed at front and rear sides of the liquid crystal panel 10 for controlling a polarization direction of light.

The backlight unit 20 is disposed at a rear side of the liquid crystal panel 10. The backlight unit 20 includes an LED assembly 29 arranged along a length direction of at least one edges of the main frame 30, a reflective sheet 25 of white or silver color on the bottom frame 50, a light guide plate 23 on the reflective sheet 25, and an optical sheet 21 on the light guide plate 23. The LED assembly 29 is positioned at one side of the light guide plate 23 and includes at least one LED 29a emitting white light and an LED printed circuit board (PCB) 29b where the LED 29a is disposed. The optical sheet 21 includes a plurality of sheets.

The liquid crystal display panel 10 and the backlight unit 20 are combined using the main frame 30 that can prevent movement of the liquid crystal panel 10 and the backlight unit 20. The top frame 40 cover edges of the liquid crystal panel 10 and sides of the main frame 30, so the top frame 40 can support and protect of the edges of the liquid crystal panel 10 and sides of the main frame 30. The bottom frame 50 covers back edges of the main frame 30, so the bottom frame 50 is combined with the main frame 30 and the top frame 40 for modulation.

FIG. 2 is an enlarged cross-sectional view of an "A" portion in FIG. 1. Referring to FIG. 2 with FIG. 1, the LED 29a is positioned at one side of the light guide plate 23 and arranged on the PCB 29b. The LED 29a has a fixed position and faces a side portion of the light guide plate 23 such that light emitted from the LED 29a is projected to the light guide plate 23. To provide a space for the LED assembly 29, the bottom frame 50 has a bending portion. Namely, the bottom frame 50 is bent upwardly. The LED assembly 29 is fixed in the bending portion of the bottom frame 50 using an element, for example, a double coated tape.

The light emitted from the LED 29a is projected to the light guide plate 23 and refracted or reflected to be projected onto the liquid crystal panel 10. The light is processed into a uniform plane light source during passing the optical sheet 21.

Unfortunately, there are some problems in the related art LCD device. For example, since there is no guide member for light from the LCD, some light is leaked through a space between the LED and the light guide plate. Accordingly, there are disadvantages in brightness and displaying image quality.

SUMMARY OF

A liquid crystal display device includes a liquid crystal panel; a backlight unit disposed under the liquid crystal panel and providing a light to the liquid crystal panel, the backlight unit including a reflective sheet, a light guide plate on the reflective sheet, an optical sheet on the light guide plate and a light emitting diode (LED) assembly at one side of the light guide plate, the light emitting diode assembly including at least one LED as a light source; a main frame that surrounds sides of the liquid crystal panel and the backlight unit, the main frame including a first portion, where the LED assembly is fixed, and a second portion extending from the first portion, the second portion covering a top portion of the LED assembly; a bottom frame under the reflective sheet and being combined with the main frame; and a top frame that surrounds an edge of the liquid crystal panel and attaches to the bottom frame and the main frame.

It is to be understood that both the foregoing general description and the following detailed description are exemplary and explanatory and are intended to provide further explanation of the disclosure as claimed.

BRIEF DESCRIPTION OF THE DRAWINGS

The accompanying drawings, which are included to provide a further understanding of the disclosure and are incorporated in and constitute a part of this specification, illustrate embodiments of the disclosure and together with the description serve to explain the principle of the disclosure. In the drawings.

DETAILED DESCRIPTION OF EXEMPLARY EMBODIMENTS

Reference will now be made in detail to exemplary embodiments of the disclosure, which are illustrated in the accompanying drawings.

Figure 1:
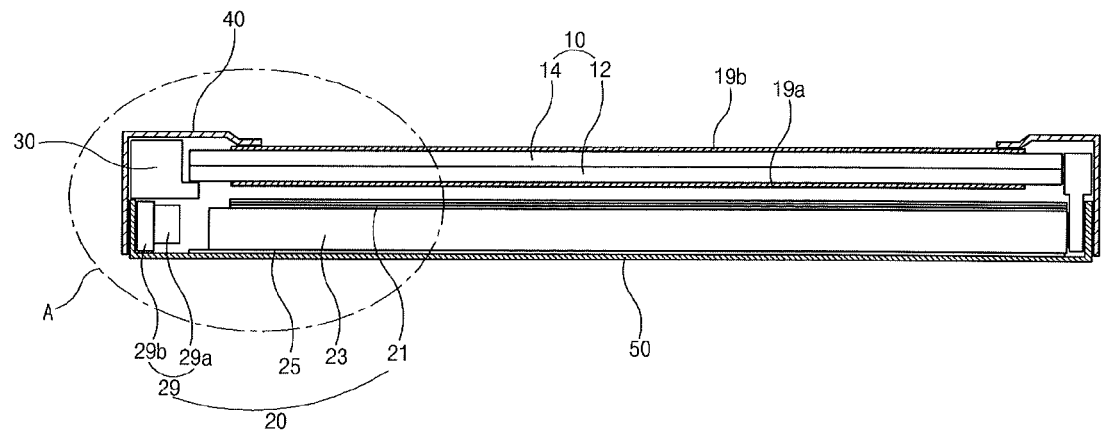
FIG. 1 a cross-sectional view of the related art LCD device using an LED as a light source.
Figure 2:
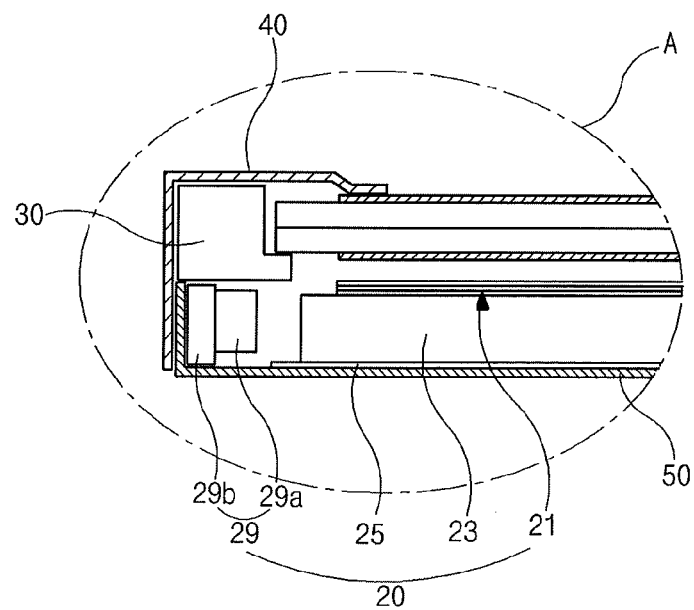
FIG. 2 is an enlarged cross-sectional view of an "A" portion in FIG. 1.
Figure 3:
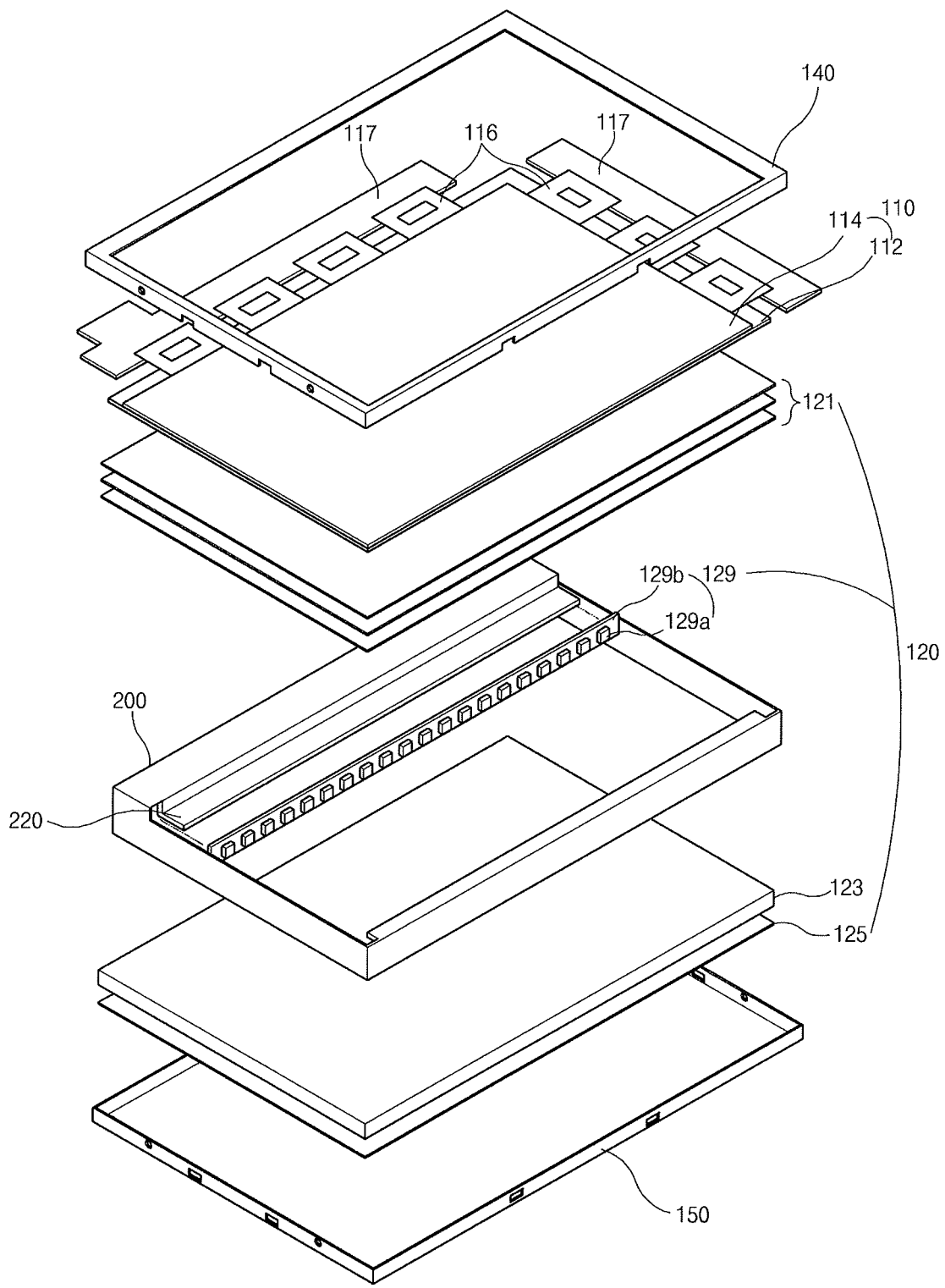
FIG. 3 is an explode perspective view of an LCD device according to the present disclosure.

FIG. 3 is an explode perspective view of an LCD device according to the present disclosure. Referring to FIG. 3, an LCD device includes a liquid crystal panel 110, a backlight unit 120, a main frame 200, a bottom frame 150 and a top frame 140.

The liquid crystal panel 110 includes first and second substrates 112 and 114 facing each other and a liquid crystal layer (not shown) therebetween. In an active matrix type, array elements, for example, a gate line (not shown), a data line (not shown), a thin film transistor (not shown) and a pixel electrode, are formed on the first substrate 112. The gate and data lines cross each other to define a pixel region, and the thin film transistor is formed at a crossing portion of the gate and data lines. The pixel electrode is disposed in the pixel region and connected to the thin film transistor. In addition, a black matrix (not shown) corresponding to the gate line, the data line and the thin film transistor to block light and a color filter layer (not shown) having red, green and blue colors are formed on the second substrate 114. A common electrode (not shown) is also formed on the second substrate 114 to generate an electric field with the pixel electrode on the first substrate 112. Moreover, first and second polarizing plates for selectively transmitting light are positioned on outer sides of the first and second substrates 112 and 114.

The liquid crystal panel 110 is connected to a driving printed circuit board (PCB) 117 through a connection member 116, for example, a flexible circuit board or a tape carrier package, that provide a scanning signal and an image signal to the liquid crystal panel 110, respectively. The driving printed circuit board 117 extends along end portions of a bottom frame 150 of the backlight unit 120, respectively, as dummy spaces.

When the thin film transistor has an ON state by the scanning signal from a gate driving circuit, the image signal is applied to the pixel electrode through the data line to produce an electric field between the pixel electrode and the common electrode. As a result, as the intensity or direction of the electric field is changed, the alignment of the liquid crystal molecules in the liquid crystal layer also changes such that light transmissivity is controlled.

To display images using the controlled transmissivity, the backlight unit 120 projecting light to the liquid crystal panel 110 is disposed at a rear side of the liquid crystal panel 110. The backlight unit 120 includes an LED assembly 129 as a light source, a reflective sheet 125 of white or silver color, a light guide plate 123 on the reflective sheet 125 and an optical sheet 121 on the light guide plate 123.

The LED assembly 129 is positioned at a side of the light guide plate 123 to provide light into the light guide plate 123. The LED assembly 129 includes a plurality of LEDs 129a and a PCB 129b where the LEDs 129a. The LEDs 129a are arranged on the PCB 129a and spaced apart from each other. One LED 129a emits red color light, another LED 129a emits green color light, and the other LED 129a emits blue color light. By turning on and off the LEDs 129a, white light is provided by a color mixture of the LEDs 129a.

Alternatively, an LED chip emits all of red, blue and green color lights may be used. Or, an LED chip for emitting white color light may be further arranged. In addition, an LED cluster including a plurality of LEDs may be used. Moreover, the LEDs 129a may be arranged on the PCB 129b in at least two rows.

The light emitted from the LED 129a travels the light guide plate 123 with a total reflection such that a plane light source is provided onto the liquid crystal panel 110. The light guide plate 123 includes patterns on a rear side of the light guide plate to provide more uniform plane light source. For example, the patterns have one of an elliptical shape, a polygonal shape and a hologram shape.

The reflective sheet 125 is disposed under the light guide plate 123 to reflect the light through the light guide plate 123 toward the liquid crystal panel 110 to increase brightness. The optical sheet 121 on the light guide plate 123 includes at least one light concentration sheet. The light through the light guide plate 123 is diffused and concentrated by the optical sheet 121 to provide more uniform plate light onto the liquid crystal panel 110.

The liquid crystal display panel 110 and the backlight unit 120 are combined using the main frame 200 that can prevent movement of the liquid crystal panel 110 and the backlight unit 120. The top frame 140 covers edges of the liquid crystal panel 110 and sides of the main frame 200 and the light crystal panel 110, so the top frame 140 can support and protect the edges of the liquid crystal panel 110 and sides of the main frame 200 and the light crystal panel 110. The bottom frame 150 covers back edges of the main frame 200, so the bottom frame 150 is combined with the main frame 200 and the top frame 140 for modulation. Four sides of the bottom frame 150 are upwardly bent. The sides of the bottom frame 150 are positioned between the main frame 200 and the top frame 140.

The main frame 200 includes a first portion 210 (of FIG. 4) and a second portion 220. The first portion 210 is vertical to the bottom frame 150. The second portion 220 vertically extends from the first portion 210 to be parallel to the bottom frame 150. The second portion 220 is positioned between the liquid crystal panel 110 and the light guide plate 123. The LED assembly 129 is attached on the first portion 210 of the main frame 200. A top portion of the LED assembly 129 is covered with the second portion 220 of the main frame 200 such that light leakage is prevented. Namely, all light from the LEDs 129a are provide into the light guide plate 123 without light leakage. In addition, heat from the LED assembly 129 is efficiently emitted into an outer space due to the main frame 200. This will be explained below in more detail.

The backlight unit 120 having the above structure may be referred to as a side light type. For requirements, two LED assemblies may be positioned at opposite sides of the light guide plate 123.

Figure 4:
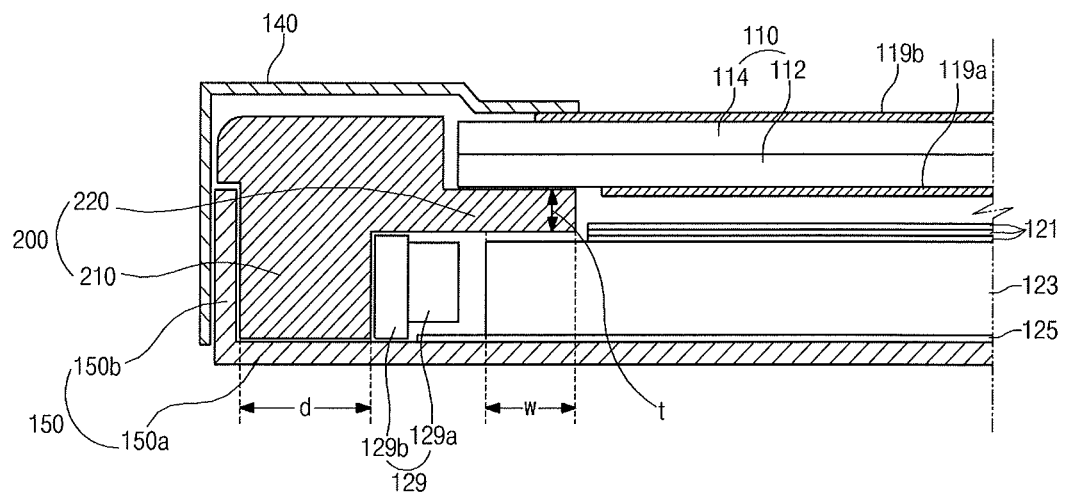
FIG. 4 is a cross-section view a portion of an LCD device according to the present disclosure.

FIG. 4 is a cross-section view a portion of an LCD device according to the present disclosure. Referring to FIG. 4, a side of the backlight unit 120, which includes the reflective sheet 125, the light guide plate 123, the optical sheet 121 and the LED assembly 129, and a side of the liquid crystal panel 110, which includes the first and second substrates 112 and 124 and the first and second polarizing plates 119a and 119b, are surrounded by the main frame 200. The bottom frame 150 including a horizontal surface 150a and a vertical surface 150b is disposed under the backlight unit 120. Front edges of the liquid crystal panel 110 are covered with the top frame 140.

The main frame 200 includes the first portion 210 vertical to the horizontal surface 150a of the bottom frame 150 and the second portion 220 vertically extending from the first portion 210 to a space between the liquid crystal panel 110 and the light guide plate 123. Namely, a rear edge of the liquid crystal panel 110 is disposed on the second portion 220 of the main frame 200, and a front edge of the light guide plate 123 is disposed under the second portion 220 of the main frame 200. In other words, the edge of the light guide plate 123 is covered with the second portion 220 of the main frame 200.

As mentioned above, the backlight unit 120 (of FIG. 3) includes the reflective sheet 125, the light guide plate 123, the LED assembly 129, and the optical sheet 121. The LED assembly 129 is disposed at a side of the light guide plate 123. This may be referred to as a side top-view backlight unit.

One side of the LED assembly 129 is covered with the first portion 210 of the main frame 200. The one side of the LED assembly 129 is attached to the first portion 210 of the main frame 200 using an adhesive material such that a position of the LED assembly 129 is fixed. A top side of the LED assembly 129 is covered with the second portion 220 of the main frame 200. In addition, the second portion 220 of the main frame 200 has a width w such that a top edge of the light guide plate 123 is covered with the second portion 220 of the main frame 200. Furthermore, a rear side of the LED assembly 129 is covered with at least one of the bottom frame 150 and the reflective sheet 125. As a result, light from the LED assembly 129 is provided into an inner space of the light guide plate 123 without light leakage. In addition, brightness and quality of displaying images are improved.

Simulation results of light efficiency according to a distance between the LED and a side of the light guide plate are shown in table 1.

TABLE 1

| Distance | Sample 1 Velocity of light [lm] | Sample 2 Velocity of light [lm] |
| --- | --- | --- |
| 0.5 mm | 89.9 | 91.0 |
| 1.0 mm | 81.8 | 91.1 |
| 1.5 mm | 69.7 | 90.9 |
| 2.0 mm | 58.0 | 90.8 |

As shown in table 1, in the backlight unit without an element for preventing light leakage (Sample 1), as a distance between the LED and the light guide plate is increased, quantity of light, i.e., velocity of the light, irradiated on the light guide plate is increased. Namely, when the distance between the LED and the light guide plate is smaller, the quantity of light irradiated on the light guide plate is increased. However, there are problems when the distance between the LED and the light guide plate is too small. For example, there are damages on the light guide plate because of heat from the LED. Accordingly, to meet a condition of light efficiency without damages, the LED is spaced apart from the light guide plate by a pre-determined space. As a result, it is impossible to obtain a narrow bezel. In addition, the maximum light efficiency is not obtained.

In the backlight unit with the main frame 200 including the first portion 210 and the second portion 220 (Sample 1), the quantity of light is substantially constant. Namely, the quantity of the light is independent from the distance between the LED and the light guide plate. Accordingly, the backlight unit has maximum light efficiency without damages on the liquid guide plate.

Simulation results of light efficiency according to a thickness of the light guide plate are shown in table 2.

TABLE 2

| Thickness | Sample 1 Velocity of light [lm] | Sample 2 Velocity of light [lm] |
| --- | --- | --- |
| 1.5T | 58.0 | 91.0 |
| 2.0T | 71.4 | 91.1 |
| 3.0T | 86.2 | 90.9 |
| 4.0T | 89.2 | 90.8 |

As shown in table 1, in the backlight unit without an element for preventing light leakage (Sample 1), as a thickness of the light guide plate is increased, quantity of light, i.e., velocity of the light, irradiated on the light guide plate is increased. However, there are disadvantages in weight and thickness of the LCD device when the thickness of the light guide plate is increased.

In the backlight unit with the main frame 200 including the first portion 210 and the second portion 220 (Sample 1), the quantity of light is substantially constant. Namely, the quantity of the light is independent from the thickness of the light guide plate. Accordingly, the backlight unit has maximum light efficiency without an increase of weight and thickness of the LCD device.

On the other hand, referring to FIG. 3, the LEDs 129a on the PCB 129b are spaced apart from each other and receive a driving voltage from an outer unit. The PCB 129b includes electrical lines on an insulating base film. The insulating base film is formed of a resin or a ceramic material. For example, the PCB 129b is one of a flexible printed circuit board or a metal core printed circuit board.

A temperature of the LED 129a as a light source is rapidly increased with an operation. The increase of temperature of the LED 129a causes a change of brightness. Accordingly, a heat-emitting member for the LED 129a is required. Recently, a metal core printed circuit board is widely used as a heat-emitting member. In this case, the metal core printed circuit board further includes an insulating layer for insulation between the base film of a metallic material and the electric lines.

In the present disclosure, the main frame 200 is formed of a metallic material such that the heat from the LED 129a is efficiently emitted into an outer space through the metal core printed circuit board and the main frame 200. To further increase heat-emitting efficiency, the first portion 210 of the main frame 200 has a width d greater than a thickness t of the second portion 220 of the main frame 200.

In addition, to increase light efficiency, a reflective film is formed on an inner surface of the first portion 210 and the second portion 220 of the main frame 200. Namely, the reflective film covers the LED 129a to increase the light efficiency. For example, a synthetic resin may be coated on the inner surface of the first and second portions 210 and 220 to form the reflective film. Alternatively, an end of the reflective sheet 125 extends to cover the inner surface of the first and second portions 210 and 220.

On the other hand, the main frame 200 further includes a third portion extending from the first portion 210 to face the second portion 220. Namely, the third portion of the main frame 200 covers a bottom portion of the LED assembly 129.

Figure 5A:
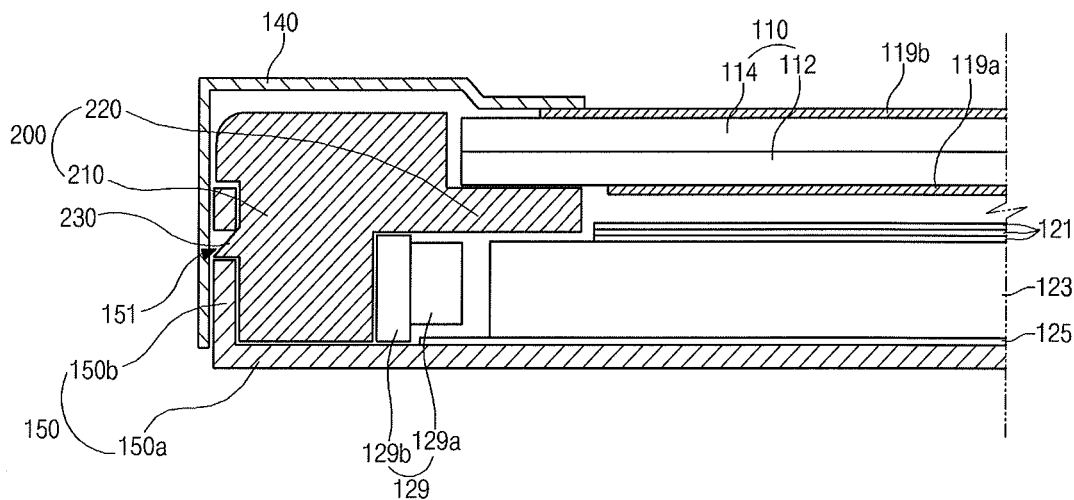
FIGS. 5A to 5D are cross-sectional views showing a combining shape of a main frame and a bottom frame of an LCD device according to the present disclosure, respectively.
Figure 5B:
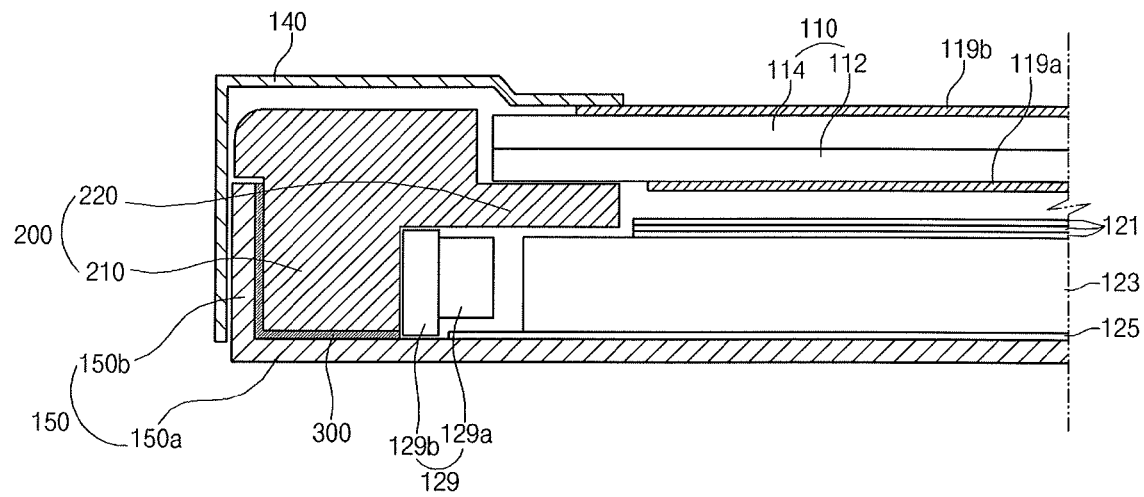
Figure 5C:
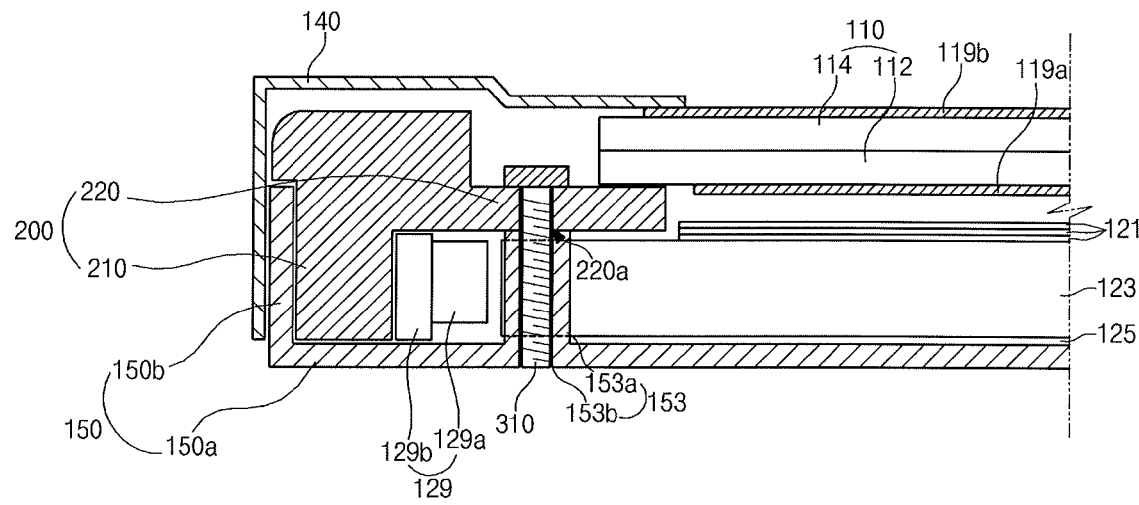
Figure 5D:
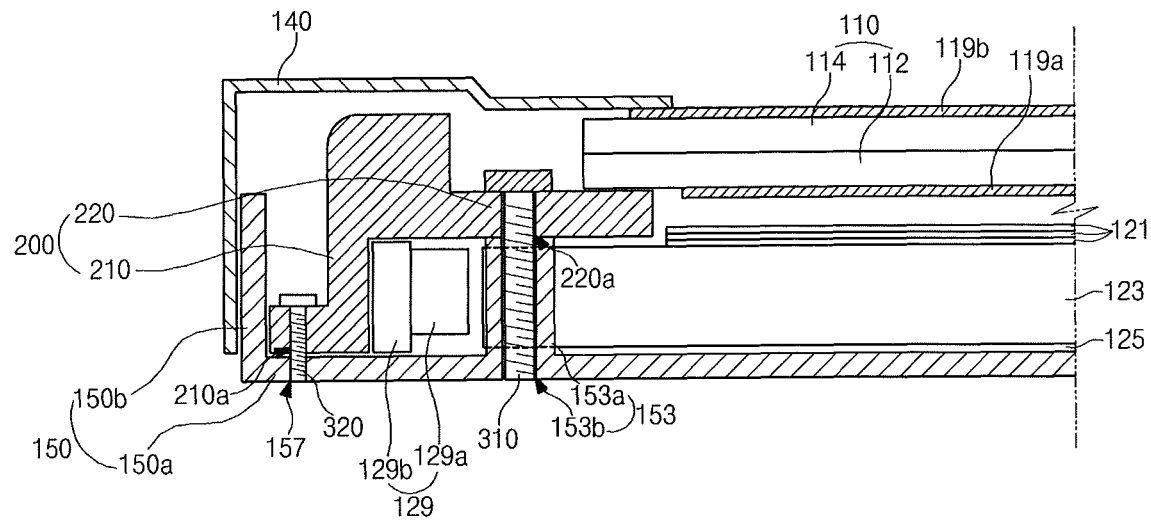
Figure 6:
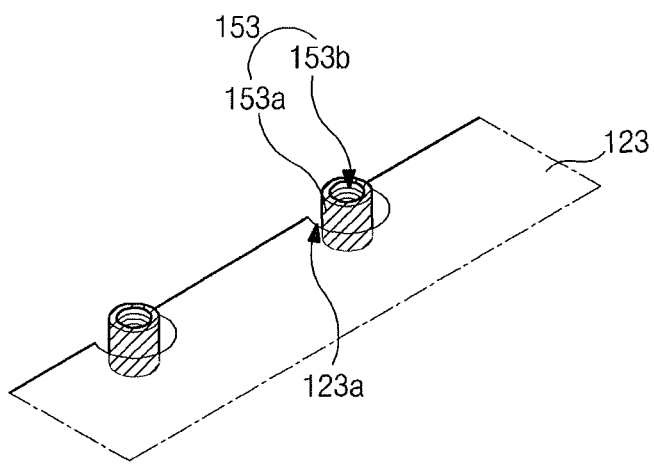
FIG. 6 is a schematic perspective view showing a light guide plate and a bottom frame of a backlight unit for an LCD device according to the present disclosure.

FIGS. 5A to 5D are cross-sectional views showing a combining shape of a main frame and a bottom frame of an LCD device according to the present disclosure, respectively, and FIG. 6 is a schematic perspective view showing a light guide plate and a bottom frame of a backlight unit for an LCD device according to the present disclosure.

Referring to FIG. 5A, a hook 230 is disposed at the first portion 210 of the main frame 200, and a hook hole 151 is disposed at the vertical surface 150b of the bottom frame 150. The hook 230 is inserted into the hook hole 151 such that the main frame 200 is combined with the bottom frame 150.

Referring to FIG. 5B, the main frame 200 is fixed on the bottom frame 150 using an adhesive element 300, for example, a double coated tape. For example, the adhesive element 300 is formed between a side surface of the first portion 210 of the main frame 200 and the vertical surface 150b of the bottom frame 150 and between a bottom surface of the first portion 210 of the main frame 200 and the horizontal surface 150a of the bottom frame 150.

Referring to FIGS. 5C and 6, the light guide plate 123 has a first groove 123a adjacent to the LED assembly 129, and the main frame 200 has a second groove 220a through the second portion 220. In addition, a column-shaped protrusion 153 is formed on the horizontal surface 150a of the bottom frame 150. The column-shaped protrusion 153 includes a protruding body 153a and a third groove 153b through the protruding body 153a. The first groove 123a, the second groove 220a and the third groove 153b overlaps one another to provide a screw hole. Namely, a first screw 310 is inserted through the first groove 123a, the second groove 220a and the third groove 153b such that the main frame 200 is combined with the bottom frame 150. Without the protruding body 153a, there are damages on the light guide plate 123 by the first screw 310. The second and third grooves 220a and 153b have the same size, and the first groove 123a has a size greater than the second and third grooves 220a and 153b. The size of the first groove 123a may be equal to the size of the protruding body 153a. Although not shown, the column-shaped protrusion 153 is positioned between two adjacent LEDs 129a (of FIG. 3). FIG. 6 shows the first groove 123a has a semicircular shape. Alternatively, the first groove 123a may have a circular shape. Namely, the first groove 123a may have the same shape as the second and third grooves 220a and 153b.

Referring to FIG. 5D, the main frame 200 further has a fourth groove 210a through the first portion 210, and the bottom frame 150 further has a fifth groove 157 through the horizontal surface 150a. The fourth groove 210a overlaps the fifth groove 157 such that a second screw 320 is inserted through the fourth and fifth grooves 210a and 157. As mentioned referring to FIGS. 5C and 6, there are the first groove 123a, the second groove 220a and the third groove 153b. Namely, the first groove 123a is formed through the light guide plate 123, and the second groove 220a is formed through the second portion 220 of the main frame 200. The third groove 153b is formed through the protruding body 153a protruding from the horizontal surface 150a of the bottom frame 150. The first screw 310 is inserted through the first groove 123a, the second groove 220a and the third groove 153b. Namely, that the main frame 200 is combined with the bottom frame 150 by the first and second screws 310 and 320.

In the present disclosure, since the LED assembly is covered with the first and second portions of the main frame, light leakage is prevented. Accordingly, the LCD device has an improved brightness and displays high brightness images. In addition, the main frame is combined with the bottom frame using the screw through the second portion of the main frame. Furthermore, since the main frame is formed of a metallic material, heat from the LED is efficiently emitted into an outer space. Accordingly, problems such as brightness changes are prevented.

It will be apparent to those skilled in the art that various modifications and variations can be made in the exemplary embodiments of the present disclosure without departing from the spirit or scope of the disclosure. Thus, it is intended that the disclosure cover the modifications and variations of this disclosure provided they come within the scope of the appended claims and their equivalents.

What is claimed is:

1. A liquid crystal display device, comprising:
a liquid crystal panel;
a backlight unit disposed under the liquid crystal panel and providing a light to the liquid crystal panel, the backlight unit including a reflective sheet, a light guide plate on the reflective sheet, an optical sheet on the light guide plate, and a light emitting diode (LED) assembly at one side of the light guide plate, the light emitting diode assembly including at least one LED as a light source, wherein the light guide plate has a part which is not covered with the optical sheet;
a main frame that surrounds sides of the liquid crystal panel and the backlight unit, the main frame including a first portion, where the LED assembly is fixed, and a second portion extending from the first portion, the second portion covering a top portion of the LED assembly;
a bottom frame under the reflective sheet, the bottom frame being combined with the main frame; and
a top frame that surrounds an edge of the liquid crystal panel and attaches to the bottom frame and the main frame and wherein the light guide plate includes a first groove at the one side neighboring the part, and the main frame includes a second groove through the second portion, and wherein the bottom frame includes a column-shaped protruding body and a third groove through the column-shaped protruding body, and a first screw is inserted through the first, second and third grooves.

2. The liquid crystal display device according to claim 1, wherein the LED assembly is fixed to the first portion of the main frame using an adhesive material.

3. The liquid crystal display device according to claim 1, wherein the main frame is formed of a metallic material, and a width of the first portion is greater than a thickness of the second portion.

4. The liquid crystal display device according to claim 1, wherein the second portion of the main frame further covers an edge of the light guide plate.

5. The liquid crystal display device according to claim 1, wherein the main frame further includes a third portion extending from the first portion to face the second portion such that a bottom portion of the LED assembly is covered with the third portion.

6. The liquid crystal display device according to claim 1, further comprising a reflective film on a surface of the first and second portions.

7. The liquid crystal display device according to claim 1, wherein the bottom frame includes a horizontal surface and a vertical surface, and the main frame further includes a hook extending from the first portion, and wherein the hook is inserted into a hook hole through the vertical surface of the bottom frame.

8. The liquid crystal display device according to claim 1, wherein the main frame is fixed on the bottom frame using an adhesive material.

9. The liquid crystal display device according to claim 1, wherein the first groove has a size greater than the second and third grooves.

10. The liquid crystal display device according to claim 1, wherein the column-shaped protruding body is positioned between two adjacent LEDs.

11. The liquid crystal display device according to claim 1, wherein the main frame includes a fourth groove through the first portion, wherein the bottom frame includes a fifth groove, and wherein a second screw is inserted through the fourth and fifth grooves.

* * * * *